(12) United States Patent
Bright et al.

(10) Patent No.: US 8,762,292 B2
(45) Date of Patent: Jun. 24, 2014

(54) SYSTEM AND METHOD FOR PROVIDING CUSTOMERS WITH PERSONALIZED INFORMATION ABOUT PRODUCTS

(75) Inventors: Douglas R. Bright, Ithaca, NY (US); Joseph Romney Evans, Newtown, MA (US); Jessica Arredondo Murphy, Chelsea, MA (US)

(73) Assignee: True Fit Corporation, Woburn, MA (US)

( * ) Notice: Subject to any disclaimer, the term of this patent is extended or adjusted under 35 U.S.C. 154(b) by 321 days.

(21) Appl. No.: 12/909,671

(22) Filed: Oct. 21, 2010

(65) Prior Publication Data

US 2011/0099122 A1    Apr. 28, 2011

Related U.S. Application Data

(60) Provisional application No. 61/254,590, filed on Oct. 23, 2009.

(51) Int. Cl.
*G06Q 30/02* (2012.01)
*G06Q 10/06* (2012.01)
*G06Q 30/06* (2012.01)

(52) U.S. Cl.
CPC ................................. *G06Q 30/0282* (2013.01)
USPC ........................................... 705/347; 705/1.1

(58) Field of Classification Search
None
See application file for complete search history.

(56) References Cited

U.S. PATENT DOCUMENTS

| | | | |
|---|---|---|---|
| 5,757,661 A | 5/1998 | Surville | |
| 6,546,309 B1 | 4/2003 | Gazzuolo | |
| 6,550,149 B2 | 4/2003 | Dowdell | |
| 6,665,577 B2 | 12/2003 | Onyshkevych et al. | |
| 6,701,207 B1 | 3/2004 | Gazzuolo | |
| 6,711,455 B1 | 3/2004 | Holloway et al. | |
| 7,114,260 B2 | 10/2006 | Nguyen et al. | |
| 7,242,999 B2 | 7/2007 | Wang | |
| 7,398,133 B2 | 7/2008 | Wannier et al. | |
| 7,479,956 B2 | 1/2009 | Shaw-Weeks | |
| 7,617,016 B2 | 11/2009 | Wannier et al. | |
| 7,623,938 B2 | 11/2009 | Luhnow et al. | |
| 7,698,170 B1 | 4/2010 | Darr et al. | |
| 8,095,426 B2 | 1/2012 | Adelman et al. | |
| 8,359,247 B2 | 1/2013 | Vock | |
| 8,429,025 B2 | 4/2013 | Fries | |

(Continued)

FOREIGN PATENT DOCUMENTS

| EP | 2119377 A1 | 11/2009 |
|---|---|---|
| WO | WO 2009/138879 A2 | 11/2009 |
| WO | WO 2009/146489 A1 | 12/2009 |
| WO | WO 2012/170884 A2 | 12/2012 |

OTHER PUBLICATIONS

International Search Report from PCT International Application No. PCT/US10/53615.

(Continued)

*Primary Examiner* — Jonathan Ouellette
(74) *Attorney, Agent, or Firm* — Wolf, Greenfield & Sacks, P.C.

(57) ABSTRACT

Embodiments of the invention may provide a personalized fit prediction to a particular consumer about a particular product. Personalization of the fit prediction may be accomplished by processing various types of data, including data about consumers, products, and previous purchases by consumers. For example, this data may be used to generate a model (e.g., set of rules), which can then be applied to predict whether and/or how well a particular product will suit a particular consumer.

42 Claims, 9 Drawing Sheets

(56) References Cited

U.S. PATENT DOCUMENTS

| | | |
|---|---|---|
| 2001/0014868 A1 | 8/2001 | Herz et al. |
| 2002/0188372 A1 | 12/2002 | Lane et al. |
| 2003/0093330 A1 | 5/2003 | Pabst et al. |
| 2004/0083142 A1 | 4/2004 | Kozzinn |
| 2004/0093105 A1 | 5/2004 | Holloway et al. |
| 2005/0101884 A1 | 5/2005 | Weeks et al. |
| 2006/0059054 A1 | 3/2006 | Adiseshan |
| 2006/0287877 A1 | 12/2006 | Wannier et al. |
| 2007/0011173 A1 | 1/2007 | Agostino |
| 2007/0022013 A1 | 1/2007 | Tousignant |
| 2007/0073586 A1 | 3/2007 | Dev et al. |
| 2007/0168357 A1 | 7/2007 | Mo |
| 2007/0198120 A1 | 8/2007 | Wannier et al. |
| 2008/0189194 A1 | 8/2008 | Bentvelzen |
| 2008/0235114 A1 | 9/2008 | Wannier et al. |
| 2009/0037295 A1 | 2/2009 | Saul et al. |
| 2009/0089186 A1 | 4/2009 | Paolini |
| 2009/0094138 A1 | 4/2009 | Sweitzer et al. |
| 2009/0144173 A1 | 6/2009 | Mo et al. |
| 2009/0276291 A1 | 11/2009 | Wannier et al. |
| 2009/0287452 A1 | 11/2009 | Stanley et al. |
| 2010/0023421 A1 | 1/2010 | Wannier et al. |
| 2010/0023426 A1 | 1/2010 | Wannier et al. |
| 2010/0030578 A1 | 2/2010 | Siddique et al. |
| 2010/0030620 A1 | 2/2010 | Wannier et al. |
| 2010/0030663 A1 | 2/2010 | Wannier et al. |
| 2010/0049633 A1 | 2/2010 | Wannier et al. |
| 2010/0076819 A1 | 3/2010 | Wannier et al. |
| 2010/0100455 A1 | 4/2010 | Song |
| 2010/0151430 A1 | 6/2010 | Jones |
| 2010/0169340 A1 | 7/2010 | Kenedy et al. |
| 2010/0293076 A1 | 11/2010 | End et al. |
| 2011/0055053 A1 | 3/2011 | Rutschmann |
| 2011/0161194 A1 | 6/2011 | Dumke et al. |
| 2011/0295711 A1 | 12/2011 | Mazmanyan |
| 2011/0298897 A1 | 12/2011 | Sareen et al. |
| 2012/0310791 A1 | 12/2012 | Weerasinghe |
| 2012/0313969 A1 | 12/2012 | Szymczyk et al. |
| 2012/0316985 A1 | 12/2012 | Wilkinson et al. |
| 2013/0013447 A1 | 1/2013 | Chityala et al. |
| 2013/0018763 A1 | 1/2013 | Ajala |

OTHER PUBLICATIONS

International Search Report and Written Opinion for International Application No. PCT/US10/53615, mailed Dec. 16, 2010.

International Search Report and Written Opinion for International Application No. PCT/US11/45737, mailed Nov. 8, 2011.

International Search Report and Written Opinion for International Application No. PCT/US2011/045719, mailed Dec. 23, 2011.

International Search Report and Written Opinion for International Application No. PCT/US11/45744, mailed Oct. 28, 2011.

Civil Action No. 07-12335-DPW, Affidavit of J. Romney Evans dated Apr. 9, 2008, filed Apr. 9, 2008.

Civil Action No. 1:12-CV-11006-GAO, Declaration of J. Romney Evans in Support of True Fit Corporation's Motion for Preliminary Injunction dated Aug. 8, 2012, filed Dec. 14, 2012.

Transcript of Hearing on Motion for Preliminary Injunction; Civil Action No. 12-cv-11006-GAO, Dec. 17, 2012.

Affidavit of J. Romney Evans, U.S. Appl. No. 12/909,671, dated Apr. 29, 2013.

YOUR OVER(B)T RATING FOR THIS ITEM IS:     EXECELLENT FIT ★★★✦

SHOW SIZE 36     SHOW SIZE 38     SHOW SIZE

| | | | | | | | | | |
|---|---|---|---|---|---|---|---|---|---|
| WAIST: | Snug | ☐ | ☐ | ☐ | ☑ | ☐ | ☐ | ☐ | ☐ | Loose |
| SEAT: | Snug | ☐ | ☐ | ☐ | ☑ | ☐ | ☐ | ☐ | ☐ | Loose |
| THIGH: | Snug | ☐ | ☐ | ☐ | ☑ | ☐ | ☐ | ☐ | ☐ | Loose |
| INSEAM: | Short | ☐ | ☐ | ☐ | ☐ | ☐ | ☐ | ☑ | ☐ | Long |

Fig. 7

SYSTEM AND METHOD FOR PROVIDING CUSTOMERS WITH PERSONALIZED INFORMATION ABOUT PRODUCTS

RELATED APPLICATIONS

This application claims priority under 35 U.S.C. §119(e) to U.S. provisional patent application Ser. No. 61/254,590, entitled "System And Method For Providing Customers With Personalized Information About Products," filed Oct. 23, 2009, which is incorporated by reference in its entirety.

BACKGROUND

With the proliferation of e-commerce sites on the World Wide Web, a growing population of consumers purchases products online rather than in a store. Purchasing products online is different from purchasing products in a store for a number of reasons, including that the consumer purchasing a product online may be somewhat limited in what he/she can learn about the product prior to purchase from the information presented online. For example, the consumer may be able to read about the product, see pictures of the product, view reviews of the product submitted by other consumers, etc. However, the consumer may not be able fully appreciate certain aspects of the product, such as its aesthetics (e.g., how it looks from certain angles), size, color, texture, etc. Often, after ordering and receiving the product, a consumer may discover that the product is not what he or she expected, and may return the product. The somewhat limited ability of consumers to evaluate products online prior to purchase can result in higher rates at which some products are returned, as compared to in-store purchases.

An entity that sells products online may incur costs in processing returns from consumers. For example, the entity may be obligated to refund the purchase price, pay for shipping to and/or from the consumer's address, repackage the product, and/or restock the product. These costs may be decreased by decreasing the number of products returned by consumers.

SUMMARY

Entities that sell products online may reduce the rate at which consumers return purchased products by providing consumers with accurate, personalized information regarding products available for sale. Providing consumers with accurate, personalized information about products may allow consumers to make more informed decisions regarding products available for purchase, and increase consumer satisfaction with purchased products. Thus, providing consumers with accurate, personalized information about products may decrease the likelihood that the consumers return purchased products.

Accordingly, some embodiments of the invention provide information regarding products that is personalized to each consumer. Personalization may include processing various types of data, including, but not limited to, data about consumers, products, and previous purchases by consumers. Data about consumers may include such information as age, demographics, location, height, weight, body measurements, heuristic information (e.g., style preferences, self-identified regional symbolic indicators, etc.) and/or other data. Data about products may include such information as the demographics of previous purchasers, size, color, and/or other information. Data about previous purchases by customers may include such information as products purchased, products returned, reasons for returning products, and/or other information. Some embodiments of the invention provide techniques whereby a machine learning engine may employ this and/or other data to facilitate the provision of personalized product information. The machine learning engine may, for example, apply techniques such as decision trees, neural networks, support vector machines, discriminant analysis, and/or other machine learning technique(s) to produce a set of rules that may be used to make a prediction whether and/or how well a product will fit a particular consumer. For example, the machine learning engine may output a decision tree, neural network and/or other output.

Some embodiments of the invention provide a fit prediction engine that employs output of the machine learning engine to provide information about products that is personalized to a particular consumer. For example, the fit prediction engine may employ a decision tree, neural network and/or other output produced by a machine learning engine to personalize information about a product for a consumer. The fit prediction engine may generate information relating to any kind of fit, including but not limited to whether a product is the appropriate size and shape for a consumer. For example, a determination whether a product is likely to fit a consumer may consider the consumer's aesthetic preferences, age, style preferences, sensibilities, and/or any of numerous other factors.

As an example, some embodiments of the invention may be employed to provide information, personalized to a particular consumer, about an item of apparel or footwear. As noted above, data considered in making this information available may include data to about the consumer, the item of apparel, and the consumer's previous purchases. Data about the consumer may include, as examples, the consumer's body measurements, sizes of items of apparel previously purchased, style preferences, age, heuristic information (e.g., body shape at certain body regions, such as at the hip, seat, stomach, thigh, etc.), and/or other information. Data about the item of apparel may include such information as its dimensions, style, demographics of previous purchasers, and/or other information. Data on the consumer's previous purchases may include such information as the items of apparel previously purchased, items previously returned, how well returned items fit, reasons for the items having been returned, and/or other information. This information may be used (e.g., applying techniques such as decision trees, neural networks, support vector machines, discriminant analysis, and/or other technique(s)) to construct a model for use in making a personalized fit prediction, which may be used to provide a consumer with personalized information about the item of apparel or footwear, such as an overall indication whether and/or how well the item may fit the consumer, how well the item matches the consumer's previously exhibited style preferences and sensibilities, and/or any of numerous other types of information.

Embodiments of the invention are not limited to employing machine learning techniques. For example, some embodiments (e.g., implementations in which historical data is not available or is limited in some fashion) may provide a consumer with personalized information about an item of apparel using data about the consumer, the item of apparel, and the consumer's previous purchases. For example, in some embodiments, multiple fit scores may be generated based on this data to predict whether and/or how well an item of apparel may fit a consumer, and these scores may be combined into an overall fit score, using any suitable technique(s) for fusing the scores.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component as illustrated in various figures is represented by a like numeral. For purposes of clarity, not every component may be to labeled in every drawing. In the drawings:

FIG. 7 is a reproduction of an example interface that may be used to present a fit prediction to a consumer for an item of a selected size, in accordance with some embodiments of the invention;

DETAILED DESCRIPTION

Figure 1:
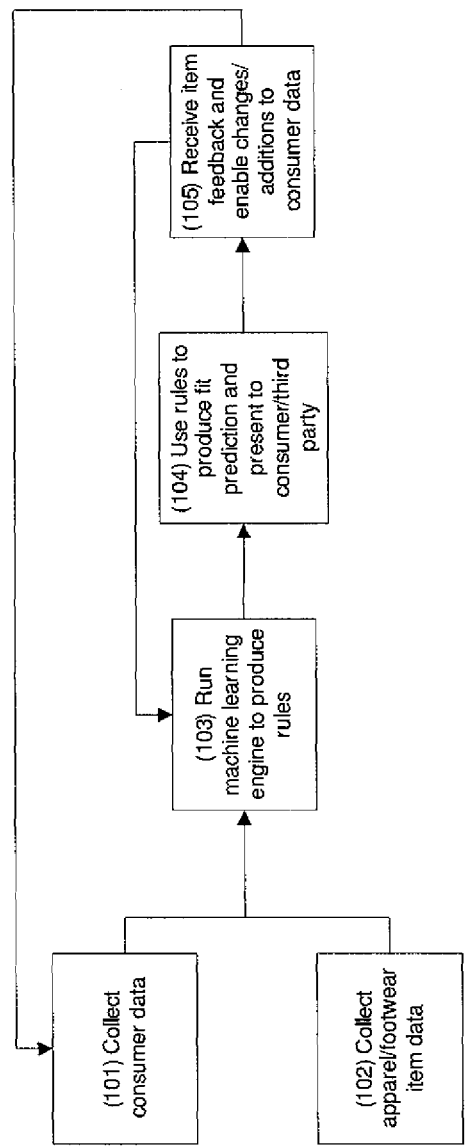
FIG. 1 is a flowchart depicting an example technique for generating a fit prediction, in accordance with some embodiments of the invention.

Some embodiments of the invention provide systems and apparatus for helping consumers identify items that suit them. Some embodiments employ an approach to this "fit prediction" by employing an approach that is robust, flexible, and can improve over time. For example, some embodiments may employ collaborative machine learning and/or artificial intelligence techniques to create a fit prediction model which may then be used to generate product information that is personalized to each consumer. The machine learning and/or artificial intelligence techniques may employ such information as data about the consumer (e.g., age, demographics, location, height, weight, body measurements, heuristic information such as style preferences, self-identified regional symbolic indicators, etc.), the product(s) (e.g., demographics of previous purchasers, size, color, etc.), and the consumer's previous purchases (e.g., products purchased, products returned, reasons for returning products, etc.), and apply techniques such as decision trees, neural networks, support vector machines, discriminant analysis, and/or other machine learning technique(s), to generate a set of rules that may be used to make fit predictions for particular consumers about particular products. A fit prediction engine may employ this output to provide personalized information about product to a consumer, such as by generating information on how an item may suit the consumer, including but not limited to whether the item is the appropriate size and shape for the consumer, suits his/her previously exhibited aesthetic preferences, age, style, sensibilities, and/or any of numerous other factors.

Applicant has appreciated that conventional techniques used for predicting whether an item will suit a consumer suffer from several shortcomings. For example, some techniques rely too heavily on body measurement data, which Applicant has observed may suffer from input error and inaccuracy. For example, consumers may be unwilling to spend the time to measure themselves accurately, measure over clothing, being unwilling to disclose actual body measurements, etc. As a result, predictions that use body measurement data are often inaccurate. For similar reasons, techniques that rely too heavily on manufacturer-supplied data can also generate inaccurate predictions. Other techniques unnecessarily require a full set of measurement data along a set of dimensions for both consumer and item, which in practice is often not available, and thus may unnecessarily exclude certain items from consideration. Still other techniques exclude items that do not satisfy measurement criteria, regardless of the margin of failure (e.g., if a consumer's armhole circumference is 0.1" larger than that of a particular top, which in practice may be acceptable to the consumer). Yet other techniques fail to consider differences in a garment's measurements when it is relaxed as opposed to when it is stretched. Other techniques involve clustering consumers and items into groups, and then predict fit by matching groups, which can degrade the accuracy of fit predictions by failing to consider individual characteristics and variations that exist amongst members of a group.

Appreciating these deficiencies in conventional approaches, some embodiments of the invention employ flexible techniques for collecting data that allow a fit prediction to be generated regardless of an imperfect set of data about the consumer and/or item. For example, data about the consumer and/or item may be retrieved from multiple diversified sources and reconciled amongst the sources, and missing data about the consumer and/or item may be inferred using data concerning other consumers or items that match the considered consumer and/or item along one or more dimensions. For example, an indication of items previously purchased by a consumer may be matched to data for other items to identify whether any of those items may suit the consumer along certain dimensions. By supplementing known characteristics of the consumer and/or item, a fit prediction may be generated that provides an accurate indication of suitability for a consumer along multiple dimensions (e.g., measurements, heuristics, regional symbolic indicators, style, etc.). Further, the fit prediction may be updated as new consumer purchase, return, or satisfaction data, or new garment data, is received, via an automatic feedback loop that can improve the accuracy of fit predictions over time.

FIG. 1 depicts an example high-level process 100 for generating a fit prediction, based on data about a given consumer and a given item, indicating whether and/or how well the item will suit the consumer along one or more dimensions. Further detail regarding the acts comprising the high-level process 100 is given below in the description with reference to FIGS. 2-6.

In FIG. 1, process 100 begins with act 101, wherein the consumer and/or a third party provide information (e.g., by providing it as input to an automated procedure) about the consumer. The information may comprise any of various types of information, including data about the consumer's body measurements, body shape heuristics, and style preferences. Any suitable type of information may be employed, as embodiments of the invention are not limited in this respect.

In act 102, measurements and/or heuristic information regarding the item are provided. This information may, for example, be provided by an expert with specialized knowledge of items of the considered type, although embodiments of the invention are not limited in this respect. Any suitable information concerning an item may be employed.

In act 103, a set of rules is produced that can be used to predict whether and/or how well a particular item will fit a particular consumer, even if the consumer has no previous interaction with that item. The set of rules may be defined in any of numerous ways. For example, in some embodiments a machine learning engine may employ the consumer data received in act 101, item data received in act 102, and/or other data (information regarding the consumer's previous interaction with other items (e.g., orders, returns, surveys, etc.), and construct a model using the data that may be used to make a fit prediction.

In act 104, the rules generated in act 103 are used to make a prediction whether and/or how well a particular item will suit a given consumer, which may be presented to the consumer and/or a third party. This may be performed using any suitable technique, as embodiments of the invention are not limited in this respect. For example, a fit prediction may be displayed to the consumer and/or third party on a graphical display, such as which may be provided by a website. The consumer and/or third party may then act based on the fit prediction. For example, if the fit prediction indicates the item may suit the consumer, then the consumer and/or third party may select the item for purchase, or if the fit prediction indicates the item may not suit the consumer, then the consumer or third party may decline to purchase the item.

In act 105, feedback regarding the item, and any changes or additions to consumer and/or item data, is received. Feedback may include information received by the consumer and/or other parties. For example, if a consumer purchases the item as a result of the fit prediction produced in act 104, then the consumer may provide feedback about the item, such as in response to a survey if the item is not returned, or an indication why the item did not suit the consumer if the item is returned. Other information to provided may include data about the consumer, such as data provided by the consumer and/or a third party.

As FIG. 1 indicates, information provided about the consumer in act 105 may be used to supplement data collected on the consumer in act 101, so that subsequent executions of process 100 may incorporate this data. Similarly, feedback provided by the consumer about the item may be used to supplement the information used in act 103 to produce rules used to generate a fit prediction in subsequent executions of process 100. Thus, process 100 may be thought of as an iterative one wherein, as data on the consumer and his/her interactions with particular items is gathered, may produce more accurate fit predictions over time.

Figure 2:
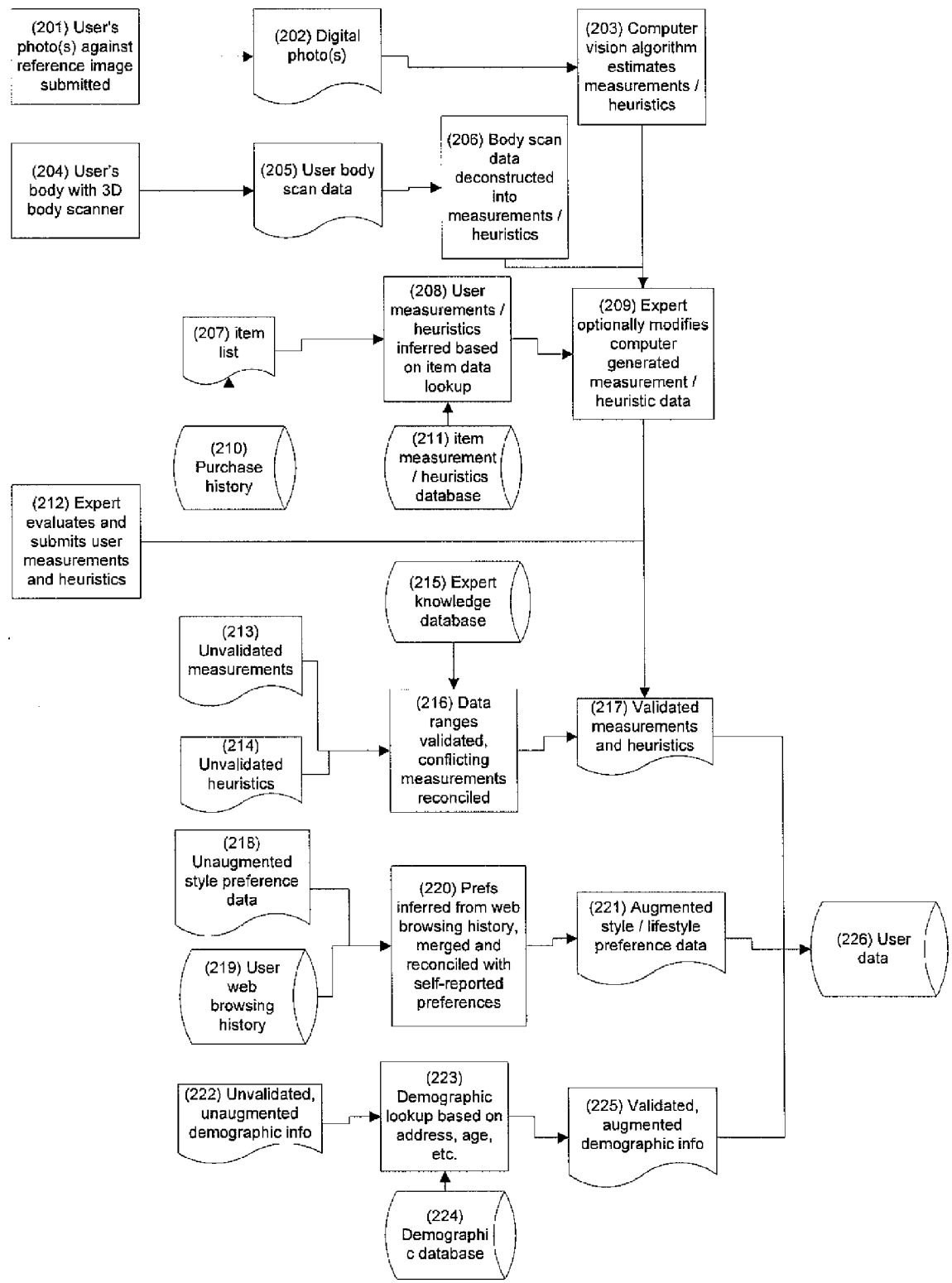
FIG. 2 is a block diagram depicting example processing and data to gather information on consumers, in accordance with some embodiments of the invention.

FIG. 2 depicts in greater detail processing and data used to collect information about a consumer in act 101, described above with reference to FIG. 1. This data may take any of numerous forms, and be provided by any of numerous sources. For example, a consumer and/or a third party may estimate or otherwise self-identify certain characteristics of the consumer, take and provide consumer measurements (e.g., taken by a professional fit tester), submit measurements for the consumer taken by an automated 3-dimensional body scanner, as indicated at 204-206, submit an estimate of measurements made using a photograph or series of photographs of the consumer positioned against a reference grid or image, as indicated at 201-203. Of course, other types of data that may be used to infer consumer measurements may be employed, as embodiments of the invention are not limited to the data types depicted in FIG. 2.

Some consumer measurements, heuristics, and style preferences may be inferred from an indication by the consumer or third party to an item that fits the consumer well, as indicated at 207 and 210. For example, a consumer may indicate that a particular brand, type, and size of shirt fits him/her well. This information may be used, for example, to look up the item's data (e.g., from a database) and supplement information on the consumer with data that matches the item's measurements, heuristics, and style data, as indicated at 208. In addition, the information may be used to analyze other consumers that bought or provided positive feedback on that item and combine (e.g., by averaging, taking the median, etc.) those other consumers' data to generate a set of measurements, heuristic, or style data for the considered consumer. Any or all of this information may be modified or supplemented by an expert (e.g., fit tester), as indicated at 209.

Information about the consumer may also include body measurements taken by the consumer and/or a third party, as indicated at 213 (e.g., waist, high hip, low hip, thigh, inseam, chest, bust, neck, foot and/or other measurements). In addition, heuristics and symbolic descriptions of body region shape, as indicated at 214 (e.g., for hip, thigh, stomach, bust regions; example symbolic tags for which may include round, flat, wide, perky, high foot arch, wide foot, etc.) may be provided. This input may then be validated. In this respect, measurements supplied by a consumer or third party may be considered "unvalidated" since they are often subject to error. For example, consumers may provide estimated measurements, or make mistakes during the measurement process (e.g., measuring at the wrong location, or not holding the measuring tape the right way). In some embodiments of the invention, consumer-supplied measurements may be compared to expected proportions to identify potential errors and suggest corrections, as indicated at 216. Once corrected (if necessary), these results may be considered "validated," as indicated at 217.

Other measurement data may include current preferred brand, style, and/or size for a specified garment category (e.g., Levi's, 501, 34" waist, 32" inseam) and symbolic descriptions of fit and style preferences (e.g., fashion forward, conservative, form-fitting), as indicated at 218. This data may be merged with information gleaned from the consumer's web browsing history, as indicated at 219, to identify the consumer's preferences, as indicated at 220-221.

Still other measurement data may include demographic information, as indicated at 222 (e.g., age, gender, address), which may be self-reported by the consumer or entered by a third party and then validated and augmented, as indicated at 223-225. The data indicated at 217, 221 and 225 may then be stored in a database of user data, as indicated at 226.

Figure 3:
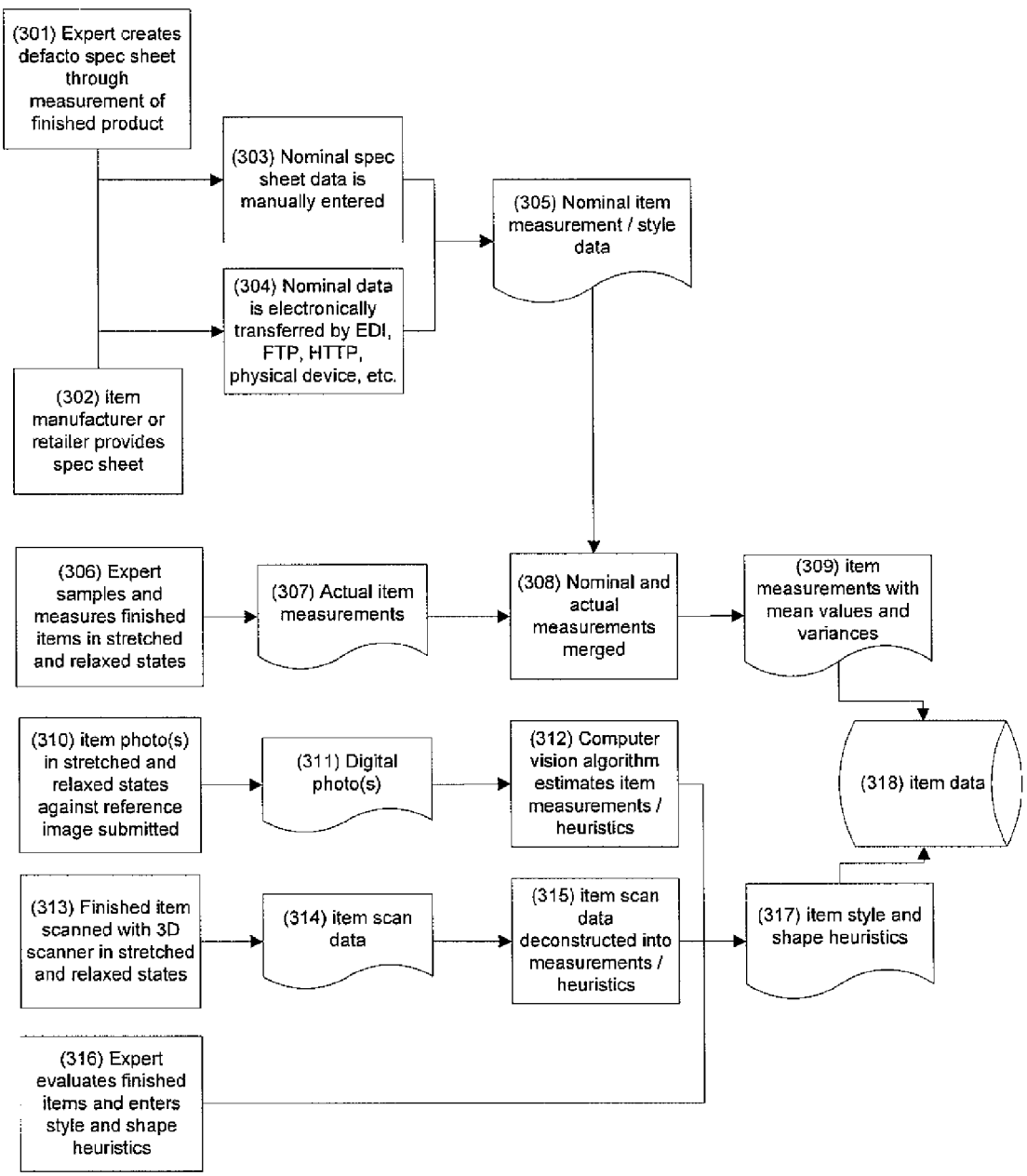
FIG. 3 is a block diagram depicting example processing and data to gather information on items, in accordance with some embodiments of the invention.

FIG. 3 depicts in greater detail data collected for an item in act 102 (FIG. 1). Data describing an item may comprise a de facto "spec sheet" (e.g., created by an expert to through measurement of the item), as indicated at 301 and 303-305, a spec sheet or technical package (e.g., provided by a garment manufacturer or retailer), as indicated at 302-305. Expert samples and measurements of the item (e.g., in stretched and relaxed states, which may be determined using a device to stretch and/or relax the item), as indicated at 306-307, may be merged with the nominal item measurement data indicated at 305, as indicated at 308, and then analyzed to determine mean values and variances, as indicated at 309. This information may then be stored in a database of information about items, as indicated at 318.

Photographs of an item against a reference image (e.g., in stretched and relaxed states), as indicated at 310-311, may be processed using a computer vision algorithm which estimates the item's measurements and heuristics, as indicated at 312. Scan images of the item (e.g., in stretched and relaxed states), as indicated at 313-314, may be processed to deconstruct the scan data into measurements and heuristics, as indicated at 315. Expert-supplied evaluations and opinions of appropriateness of the item for given style and body shape descriptions, as indicated at 316. All of the data indicated at 312, 315 and 316 may then be combined, as indicated at 317, and then stored in a database of information about items, as indicated at 318.

Any or all of the data described with reference to FIGS. 2 and 3 may be used by a machine learning engine to define the criteria whereby a fit prediction is made, and adjust those criteria over time. In some embodiments, machine learning engine may analyze these and/or data from other sources to define generalized rules which allow a fit prediction to be produced for a given consumer and item. The machine learning engine may be routinely re-run, whether in real-time or at prescheduled intervals, to identify trends, correlations, and relationships in the data and incorporate new findings into a newly defined set of rules, algorithms, and/or models. Thus, fit predictions employing these rules, algorithms, and/or models may become more accurate over time, as data is augmented, changes, or is supplemented.

Figure 4:
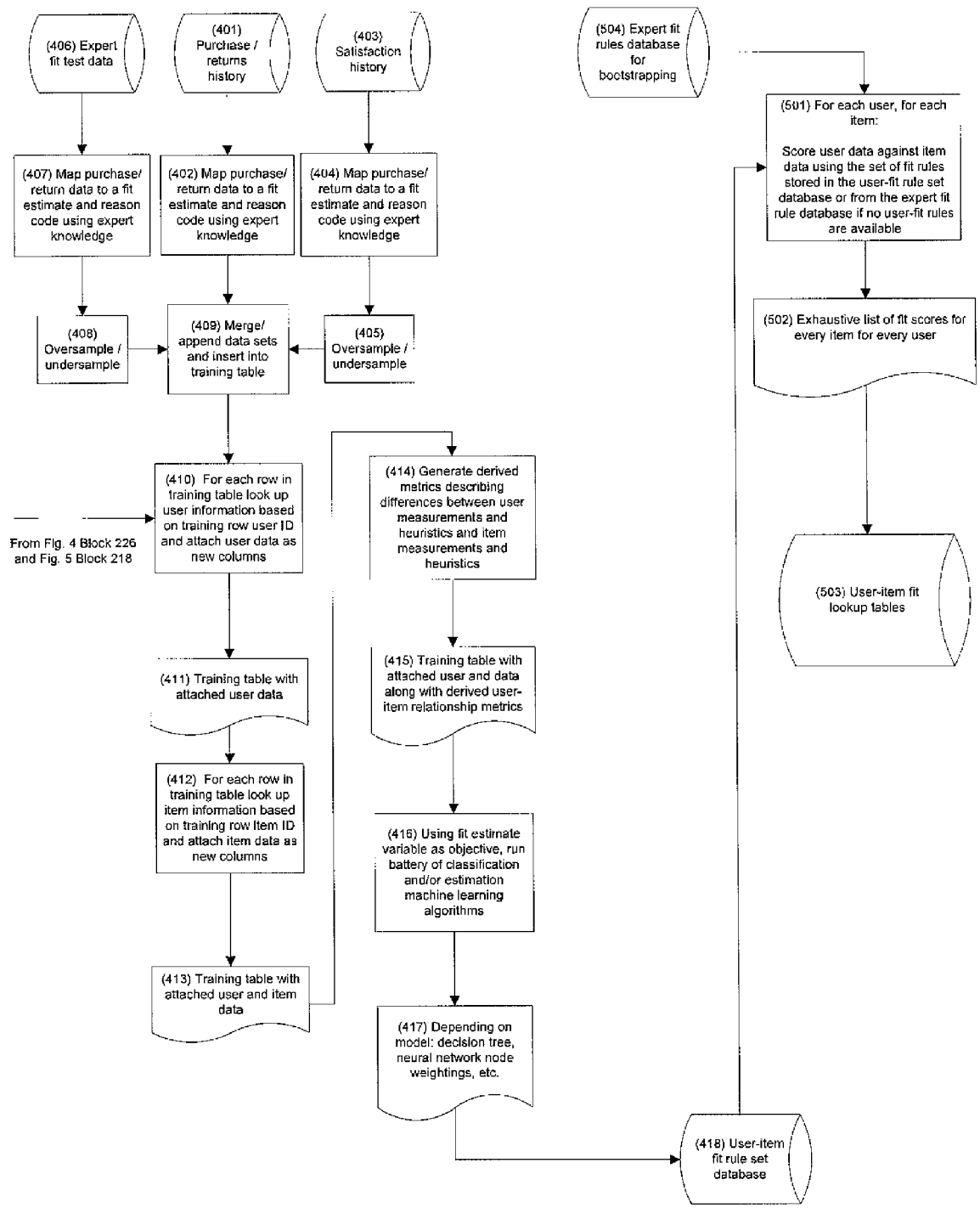
FIG. 4 is a block diagram depicting example processing and data used to train and/or bootstrap a machine learning engine, in accordance with some embodiments of the invention.

In some embodiments, developing a set of rules used to make a fit prediction involves training the machine learning engine on historical data. FIG. 4 depicts example processing performed by, and data used to train, a machine learning engine implemented in accordance with embodiments of the invention. In general, the example shown in FIG. 4 includes processing performed to assemble training data by combining information received from various sources into a single flat file which may then be processed by a machine learning engine. Of course, the invention is not limited to such an implementation, as training data may be assembled in any suitable fashion and stored in any suitable manner. Embodiments of the invention are not limited in this respect.

In the example depicted in FIG. 4, one source of training data is information on purchases and returns by consumers, as indicated at 401. Included may be, for example, records describing orders and returns processed by one or more retailers. Each record may include an order ID, order date, associated consumer ID, associated item ID, a flag indicating whether the item was returned, and if a flag is present, a return reason code.

In the example shown, the item returned flags and return reason codes included in this information are mapped to a continuous or discrete numerical value representing how well the item is estimated to have fit the consumer, as indicated at 402. In addition, a return reason code is mapped to a more generic "reason code," such as one which references an external lookup table (not depicted in FIG. 4) describing a reason for an estimated fit. For example, if the consumer did not return the item in a purchase reflected by a record stored in data store 401, then it may be assumed that the item fit the consumer, an estimated fit result of 1 may be assigned, and no return reason code may be recorded. An example order record reflecting a purchase in which the consumer did not return the item is shown below in Table 1.

TABLE 1

| Record Source | Date | Consumer ID | Item ID | Fit Estimate | Reason Code |
|---|---|---|---|---|---|
| Order | 2009 Oct. 12 | 2000 | 30 | 1 | |

If, however, the consumer returned the item with a return reason code signifying that the waist was too small, an estimated fit result of 0 may be assigned, and a return reason code may be recorded to indicates that the item was "too small in waist". An example purchase record reflecting a purchase in which the item was returned because the waist was too small (reflected as reason code 1 in this example) is shown in Table 2 below.

TABLE 2

| Record Source | Date | Consumer ID | Item ID | Fit Estimate | Reason Code |
|---|---|---|---|---|---|
| Order | 2009 Oct. 2 | 2001 | 31 | 0 | 1 |

If the consumer returned the item with a return reason code signifying that the item was damaged in transit, the machine language engine may be programmed to draw no conclusion on a fit estimate, and the return reason code may be recorded to indicate "item damaged in transit." An example purchase record reflecting a purchase in which the item was returned because it was damaged in transit (reflected as reason code 99 in this example) is shown in Table 3 below.

TABLE 3

| Record Source | Date | Consumer ID | Item ID | Fit Estimate | Reason Code |
|---|---|---|---|---|---|
| Order | 2009 Oct. 12 | 2002 | 32 | | 99 |

Example purchase records, appended as described above, may be stored for use in training the machine learning engine, as indicated. An example set of one hundred purchase records is depicted in part in Table 4 below.

TABLE 4

| Record ID | Record Source | Date | Consumer ID | Item ID | Fit Estimate | Reason Code |
|---|---|---|---|---|---|---|
| 1 | Order | 2009 Oct. 12 | 2000 | 30 | 1 | |
| 2 | Order | 2009 Oct. 12 | 2001 | 31 | 0 | 1 |
| 3 | Order | 2009 Oct. 13 | 4213 | 123 | 1 | |
| 4 | Order | 2009 Oct. 13 | 5354 | 651 | 1 | |
| 5 | Order | 2009 Oct. 13 | 2163 | 766 | 1 | |
| 6 | Order | 2009 Oct. 13 | 1399 | 981 | | 999 |
| 7 | Order | 2009 Oct. 14 | 132 | 410 | 1 | |
| ... | ... | ... | ... | ... | ... | ... |
| 100 | Order | 2009 Oct. 19 | 2981 | 908 | 0 | 3 |

In some embodiments, instances where a consumer indicates multiple return reasons may be recorded, for example, as multiple purchase records, with one record for each return reason code. Of course, embodiments of the invention are not limited to storing data in this manner. With respect to the specific issue of multiple return reason codes, data may be stored in multiple rows, multiple tables, multiples databases, or need not be stored in a database at all.

Information on consumer satisfaction may also be used to train the machine learning engine, as indicated at 403. This information may include, for example, data provided by consumers indicating how well the consumers felt various items fit them. This data may be collected from sources which include, as examples, surveys, interviews, consumer interactions with consumer service representatives, and/or other sources. The data may include, for each record, a consumer ID, item ID, a date of interaction (survey, interview, etc.), an indication of perceived fit, and dimension of fit. In some embodiments, one record may be provided for each dimension of fit for which the consumer has provided feedback. For example, if a consumer having consumer ID 10 specifies that an item having item ID 20 was too tight in the arms and a little too short, two records may be stored, one indicating that item 20 was "too tight in the arms" and another indicating that item ID 20 was "a little too short."

In some embodiments, a consumer's perception of fit and dimension of fit may be mapped to a continuous or discrete numerical value that represents how well the item is perceived to have fit, and map the perception and dimension of fit to a more generic "reason code" that references another external lookup table that describes the reason for the estimated fit, as indicated at 404. Using the example given above in which consumer 10 specified that item 20 was "too tight in the arms" and "a little too short" to illustrate, Table 5 depicts example records below.

TABLE 5

| Record Source | Date | Consumer ID | Item ID | Fit Estimate | Reason Code |
|---|---|---|---|---|---|
| Satisfaction | 2009 Oct. 15 | 100 | 200 | 0.1 | 12 |
| Satisfaction | 2009 Oct. 15 | 100 | 200 | 0.5 | 8 |

In Table 5, reason code 12 indicates "too tight in the arms" and reason code 8 to indicates "a little too short." The fit estimate of 0.1 reflects an expert's opinion (e.g., as expressed in a lookup table not depicted in FIG. 4) that too tight in arms is an indication of very poor fit, though perhaps still wearable (0 would indicate that the item is un-wearable). The fit estimate of 0.5 reflects an expert's opinion that "a little too short" indicates that the item, while not a perfect fit, is not a poor fit either. The information processed as indicated at 404 may then be sampled (e.g., oversampled or undersampled).

Also used to train the machine learning engine may be expert fit test data, as indicated at 406. This information may include, for example, data indicating results of a process whereby real-world consumers or non-consumers try out various clothing or footwear items and an expert evaluates how each item fits each consumer along various dimensions. Data store 406 may store information as a score along each of a set of selected dimensions. For example, an expert fit tester may have consumer 10 wear item 20, and then evaluate (e.g., on a scale of 1 to 5) how the item fits the consumer in the hips, waist, thigh, calf, etc. and whether the item flatters the consumer in various areas.

The data indicated at 406 may store records that reflect the fit of an item on one or more consumers, along one or more dimensions, and a reason code for each dimension, as indicated at 407. In this respect, Table 6 below includes example data reflecting an evaluation of a particular item (item ID 60) on three consumers (consumer ID 105, 106, 107) along four dimensions, with a reason code appended. Each record in Table 6 includes an indication of consumer ID, item ID, date of test, expert's perception of fit, and dimension.

TABLE 6

| Record Source | Date | Consumer ID | Item ID | Fit Estimate | Reason Code |
|---|---|---|---|---|---|
| FitTest | 2009 Oct. 15 | 105 | 600 | 0.5 | 4 |
| FitTest | 2009 Oct. 15 | 105 | 600 | 0.75 | 8 |
| FitTest | 2009 Oct. 15 | 105 | 600 | 0.1 | 14 |
| FitTest | 2009 Oct. 15 | 105 | 600 | 0.4 | 100 |
| FitTest | 2009 Oct. 15 | 106 | 600 | 0.85 | 4 |
| FitTest | 2009 Oct. 15 | 106 | 600 | 0.9 | 14 |
| FitTest | 2009 Oct. 15 | 106 | 600 | 0.9 | 15 |
| FitTest | 2009 Oct. 15 | 106 | 600 | 0.9 | 100 |
| FitTest | 2009 Oct. 15 | 107 | 600 | 0.5 | 14 |
| FitTest | 2009 Oct. 15 | 107 | 600 | 0.6 | 12 |
| FitTest | 2009 Oct. 15 | 107 | 600 | 1.0 | 6 |
| FitTest | 2009 Oct. 15 | 107 | 600 | 0.8 | 100 |

In the example of Table 6, reason codes may be defined as shown in Table 7, shown below.

TABLE 7

| Reason Code | Description |
|---|---|
| 4 | Rise too low |
| 6 | Too large in thigh |
| 8 | Inseam too short |
| 12 | Unflattering in seat |
| 14 | Too large in hips |
| 15 | Too small in hips |
| 100 | Did not like style |

Figure 6:
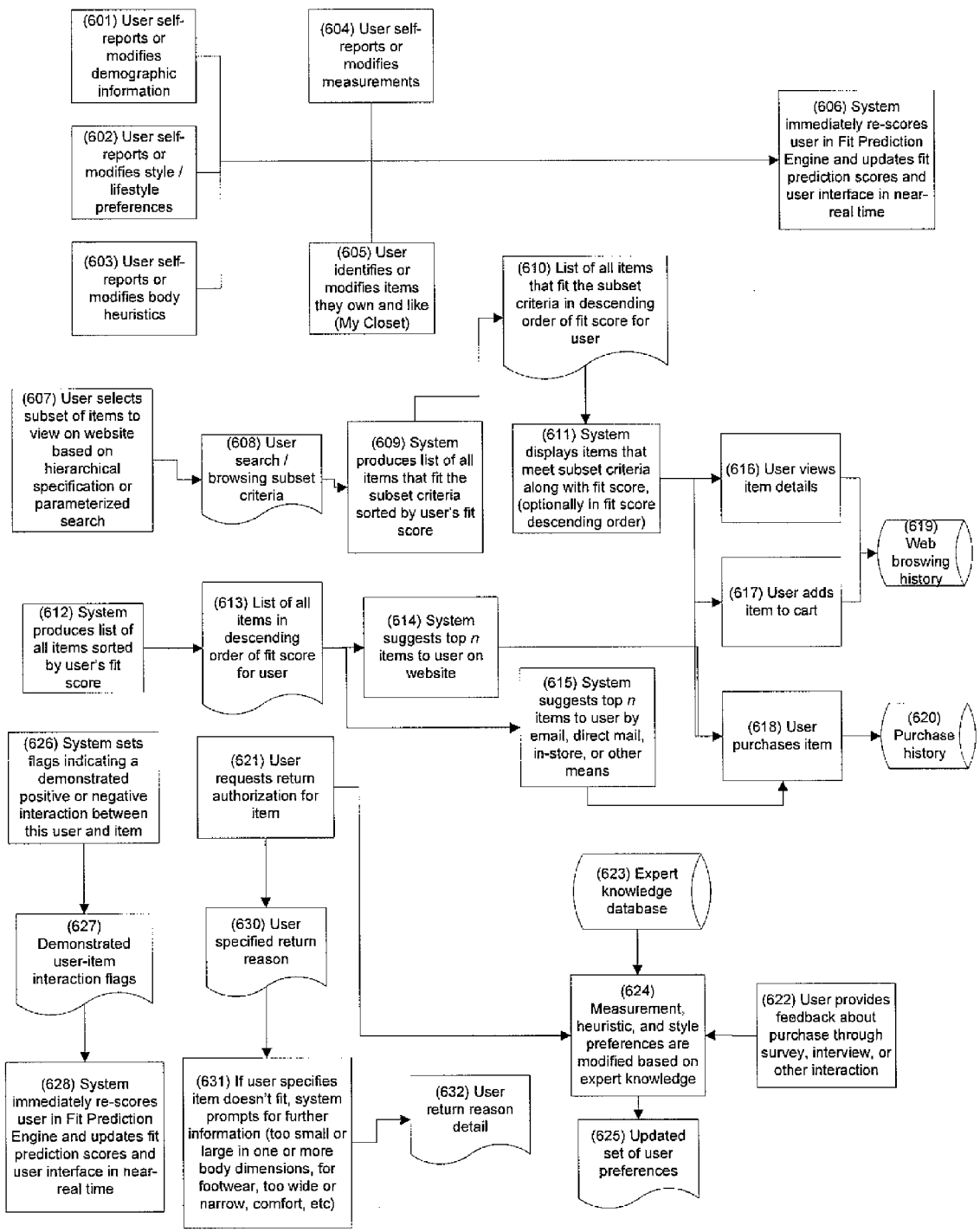
FIG. 6 is a block diagram depicting example processing and data captured via interaction between a consumer and one or more interfaces, in accordance with some embodiments of the invention.

In the example shown in FIG. 6, the data processed as indicated at 407 and 404, or a sampling thereof (as indicated at 408 and 405, respectively), may be merged with the data processed as indicated at 409.

Merged training data may reflect information in any suitable fashion. For example, although the example Tables 1-6 above include a fit estimate score from 0 to 1, and a reason code, embodiments of the invention may use any suitable convention for expressing or representing a particular concept. For example, a dimension code could be used in Table 6 (e.g., identifying a dimension of measurement, such as armhole circumference, waist, inseam, etc.), rather than the reason codes included in Table 7. Similarly, a fit estimate could be provided in a range of −1 to 1, wherein a negative number indicates too short, tight, small, etc., and positive numbers indicate too large, loose, long, etc., and 0 indicates a perfect fit. Embodiments of the invention may be implemented in any of numerous ways.

Merged training data is then augmented by attaching a column representing how the considered consumer perceives the considered item overall, expressed as an indication of positive or negative interaction (0 to 1), as indicated at 410-411. This may be useful, for example, in accounting for the experiences of individual consumers who have expressed satisfaction or dissatisfaction with particular items, and be used to train the machine learning engine to produce a rule or set of rules that say "if this consumer liked or disliked this item in the past, force the predicted fit score for this item to be appropriately high or low for that individual consumer in the future." This may also be achieved in other ways, such as by including special processing in the fit prediction engine that explicitly enforces this rule instead of modifying training data to encourage the machine learning engine to create this rule.

In some embodiments, the training data shown in Table 4 may be further augmented by attaching consumer measurement, heuristic, and style data to each row. For example, the consumer ID included in each row of the table may be used to lookup information in a consumer database 226 (FIG. 2), and that information may be attached as columns in the table. In some embodiments, a column may be attached for any or all of the following items of information: measurement data (e.g., neck circumference, chest circumference, arm length, arm circumference, waist circumference, high hip circumference, low hip circumference, rise, thigh circumference, calf circumference, foot length, foot width, inseam length, height, weight, etc.), heuristic data (e.g., torso shape, hip shape, seat shape, stomach shape, thigh shape, calf shape, arch shape, body shape, usual inseam, usual size (e.g., for knit shirts, dress shirts, pants/slacks, jeans, casual dresses, formal dresses, skirts, shorts, bra, swim suit, dress shoe, athletic shoe, etc.), favorite brand, favorite style, whether a size fluctuation is typical, fluctuate direction, typical fit, typical sit), demographic data (e.g., annual income, annual income source, ethnicity, ethnicity source, age, age source, sex, sex source, etc.).

A condensed example of a training data record after this attachment of information is complete is shown below in Table 8.

TABLE 8

| Record Source | Date | Consumer ID | Item ID | Fit Estimate | ... | Sex | Sex Source |
|---|---|---|---|---|---|---|---|
| Order | 2009 Sep. 1 | 2001 | 31 | 0 | ... | 27 | 34 |

In some embodiments, data may be associated with a consumer profile rather than a consumer ID. In this respect, Applicant has appreciated that a consumer may have multiple profiles over time, each with a separate set of measurements, heuristics, etc. Changes may occur, for example, as the consumer edits his/her profile to describe their body at a given time, since many consumers' bodies may change shape over time (e.g., due to losing and gaining weight, growing, etc.). Using different consumer profiles may enable improved fit predictions, since an accurate reference may be used to the consumer's measurements and heuristics at a given time of the purchase, survey, fit test, etc. In addition, consumer profiles may be useful in enabling one consumer to purchase clothing for another consumer (e.g., as a gift, buying for family members, friends, spouses, etc.) based on the consumer profile of another consumer. This may enable a consumer to purchase clothing that better fits another consumer rather than simply purchasing something for another person without the benefit of fit prediction technology.

In the example shown, training data is also augmented with item data, as indicated at 412-413. For example, the item ID in each row of the training data may be used to look up various information on an item. Some examples of data for an item are style, color/wash, fabric, size, measurement data (e.g., neck, sleeve length, arm, waist (relaxed), waist (extended), high hip, high hip (extended), low hip, low hip (extended), front rise, back rise, thigh, thigh (extended), knee, inseam, outseam, leg opening, shoe last, shaft circumference and/or other measurements), heuristic data (e.g., waist type, thigh type, leg type, leg length, torso length, hip shape min, seat shape, stomach shape, thigh shape, age appropriate range, and/or other heuristics). Of course, other item data may also, or alternatively, gathered, as embodiments of the invention are not limited in this respect.

In some embodiments, item data may be attached to each row of training data, with each article of data occupying a column appended to the end of each training data row. Of course, embodiments of the invention are not limited to such an implementation, as item data may be stored and/or accessed in any suitable fashion.

In some embodiments, training data may also be supplemented with one or more metrics that relate data on the item and the consumer, as indicated at 414-415. Each metric may, for example, define a relationship between an item dimension and a consumer dimension. As an example, assume that a row of training data describes an item with a waist measurement of 36" that was purchased by a consumer with a waist measurement of 32," and then returned. From this information alone, incorrect conclusions could be drawn by the machine learning engine, such as that either items with 36" waist measurements don't generally fit consumers well, or that consumers with 32" waists usually return items. However, by providing a metric which defines a relationship between an item dimension and a consumer dimension (e.g., provides the difference between the two measurements, which in this example is 4"), a more accurate conclusion may be drawn that that an item with a waist measurement that is 4" larger than the waist measurement for a consumer will be a poor fit for that consumer.

Example metrics which may be employed to train a machine learning engine implemented in accordance with embodiments of the invention include those listed in Table 9, below.

TABLE 9

| Metric | Description |
|---|---|
| Hip Shape Delta | Absolute value of difference between hip shape of consumer and expert opinion of flattering hip shapes for item. Hip shapes are defined as curvy = 0, average = 1, straight = 2. |
| Seat Shape Delta | Absolute value of difference between seat shape of consumer and expert opinion of flattering seat shapes for item. Seat shapes are defined as flat = 0, average = 1, perky/high = 2, full/wide = 3 |
| Stomach Shape Delta | Absolute value of difference between stomach shape of consumer and expert opinion of flattering seat shapes for item. Seat shapes are defined as flat = 0, average = 1, round/low = 2, round/high = 3 |
| Thigh Shape Delta | Absolute value of difference between thigh shape of consumer and expert opinion of flattering seat shapes for item. Seat shapes are defined as slim = 0, average = 1, full = 2, muscular = 3 |
| Age Appropriate | Flag indicating whether consumer falls within an age bracket marked as appropriate by an expert |
| Age 1 Older Appropriate | Flag indicating whether consumer falls within the age bracket immediately younger than considered appropriate for item by an expert |
| Age 1 Younger Appropriate | Flag indicating whether consumer falls within the age bracket immediately older than considered appropriate for item by an expert |
| Waist Relaxed Delta | Difference in inches between item's relaxed waist measurement and consumer's waist measurement |
| Waist Extended Delta | Difference in inches between item's extended waist measurement and consumer's waist measurement |
| Low Hip Relaxed Delta | Difference in inches between item's relaxed low hip measurement and consumer's low hip measurement |
| Low Hip Extended Delta | Difference in inches between item's extended low hip measurement and consumer's low hip measurement |
| High Hip Relaxed Delta | Difference in inches between item's relaxed high hip measurement and consumer's high hip measurement |
| High Hip Extended Delta | Difference in inches between item's extended high hip measurement and consumer's high hip measurement |
| Thigh Delta | Difference in inches between item's thigh measurement and consumer's thigh measurement |
| Inseam Delta | Difference in inches between item's inseam measurement and consumer's inseam measurement |
| Sit Delta | Difference in inches between consumer's rise measurement and rise measurement of the garment |

TABLE 9-continued

| Metric | Description |
| --- | --- |
| Fav Brand Waist Relaxed Delta | Number of standard deviations this item's relaxed waist measurement is from the mean of relaxed waist measurements for all apparel items of the same type in the consumer's specified favorite brand and size |
| Fav Brand High Hip Extended Delta | Number of standard deviations this item's extended high hip measurement is from the mean of extended high hip measurements for all apparel items of the same type in the consumer's specified favorite brand and size |
| Fav Brand High Hip Relaxed Delta | Number of standard deviations this item's relaxed high hip measurement is from the mean of relaxed high hip measurements for all apparel items of the same type in the consumer's specified favorite brand and size |
| Fav Brand Low Hip Extended Delta | Number of standard deviations this item's extended low hip measurement is from the mean of extended low hip measurements for all apparel items of the same type in the consumer's specified favorite brand and size |
| Fav Brand Low Hip Relaxed Delta | Number of standard deviations this item's relaxed low hip measurement is from the mean of relaxed low hip measurements for all apparel items of the same type in the consumer's specified favorite brand and size |
| Fav Brand Front Rise Delta | Number of standard deviations this item's front rise measurement is from the mean of front rise measurements for all apparel items of the same type in the consumer's specified favorite brand and size |
| Fav Brand Back Rise Delta | Number of standard deviations this item's back rise measurement is from the mean of back rise measurements for all apparel items of the same type in the consumer's specified favorite brand and size |
| Fav Brand Thigh Delta | Number of standard deviations this item's thigh measurement is from the mean of thigh measurements for all apparel items of the same type in the consumer's specified favorite brand and size |
| Fav Brand Knee Delta | Number of standard deviations this item's knee measurement is from the mean of knee measurements for all apparel items of the same type in the consumer's specified favorite brand and size |
| Fav Brand Inseam Delta | Number of standard deviations this item's inseam measurement is from the mean of inseam measurements for all apparel items of the same type in the consumer's specified favorite brand and size |
| Fav Brand Leg Opening Delta | Number of standard deviations this item's leg opening measurement is from the mean of leg opening measurements for all apparel items of the same type in the consumer's specified favorite brand and size |

In some embodiments, any or all of the metrics listed above may be attached to each row of training data, with each metric occupying a column appended to a training data row. Of course, embodiments of the invention are not limited to such an implementation, as item data may be stored and/or accessed in any suitable fashion.

The machine learning engine may then analyze the data to relate variables in the training data (e.g., stored in columns in each row of the training data) to an objective variable (e.g., the Fit Estimate variable), as indicated at 416. Any of numerous techniques may be employed to identify relationships, including predictive modeling to techniques such as Decision tree models (e.g., Classification and Regression Tree, CHAID, C 5.1, QUEST, and/or other decision tree models), Statistical models (e.g., Linear Regression, Logistic Regression, and/or other statistical models), Neural Networks, and/or other modeling techniques. Embodiments of the invention are not limited to using any one or more techniques to define relationships between training data variables and an objective variable, as any suitable technique(s) may be employed.

Output of this processing, indicated at 417, may be formatted in a way that depends on the technique(s) employed. As examples, if a classification and regression (C&R) Tree or CHAID are used, then input and output may be somewhat similar, except that a C&R tree may generate only binary decision splits, while a CHAID model may generate multiple splits. For either a C&R tree or CHAID model, training data input variables may be continuous or categorical, meaning that data comprising a number (e.g., a waist measurement, like 32") or a category (e.g., a seat shape, like perky) may be used, and special processing may not be required to prepare predictor variables for analysis. A C&R tree or CHAID model may employ one or more objective variables, including a fit to estimate, which may be a continuous variable (e.g., ranging from 0 to 1, −1 to 1, etc.) or categorical variable, and/or take any other suitable form. The decision tree may be expressed graphically, using plain text, binary or text encoded, or structured query language (SQL).

QUEST and C5.0 modeling techniques also produce a decision tree as output, but these differ from C&R tree and CHAID models with respect to internal processes and input requirements. Each is designed to address limitations with other techniques. Specifically, the QUEST modeling technique is designed to reduce processing time for large datasets, and the C5.0 modeling technique is designed to order output in descending order of most "information gain." Generally, these techniques allow for input data formatted similarly to that of C&R trees and CHAID models described above, and may require no special processing to prepare that input for analysis. With respect to output, however, QUEST and C5.0 models require that an objective variable be categorical, not continuous. As a result, "binning" of fit estimate variables may be performed to map the variables to categories. For example, fit estimates from 0 to 0.25 may be "binned" in category 0, 0.25 to 0.5 to category 1, 0.5 to 0.75 to category 2, 0.75 to 1 to category 3, etc. When generating decision tree output, categorical values at the terminus of each decision tree branch may be "unmapped" to continuous values. For example, each category 0 may be unmapped to a score of 0.25, each category 1 may be unmapped to a score of 0.5, etc. Any suitable technique(s) may be employed to generate a categorical objective variable, and to generate a continuous variable from that categorical variable, as embodiments of the invention are not limited in this respect.

Of course, not all embodiments of the invention may employ the techniques listed above, and other modeling techniques employed may require special processing to prepare input for analysis. This special processing may entail, for example, mapping training data to variable types and ranges used by a particular modeling technique and/or mapping outputs of each modeling technique to a format used by the output model.

Figure 5:
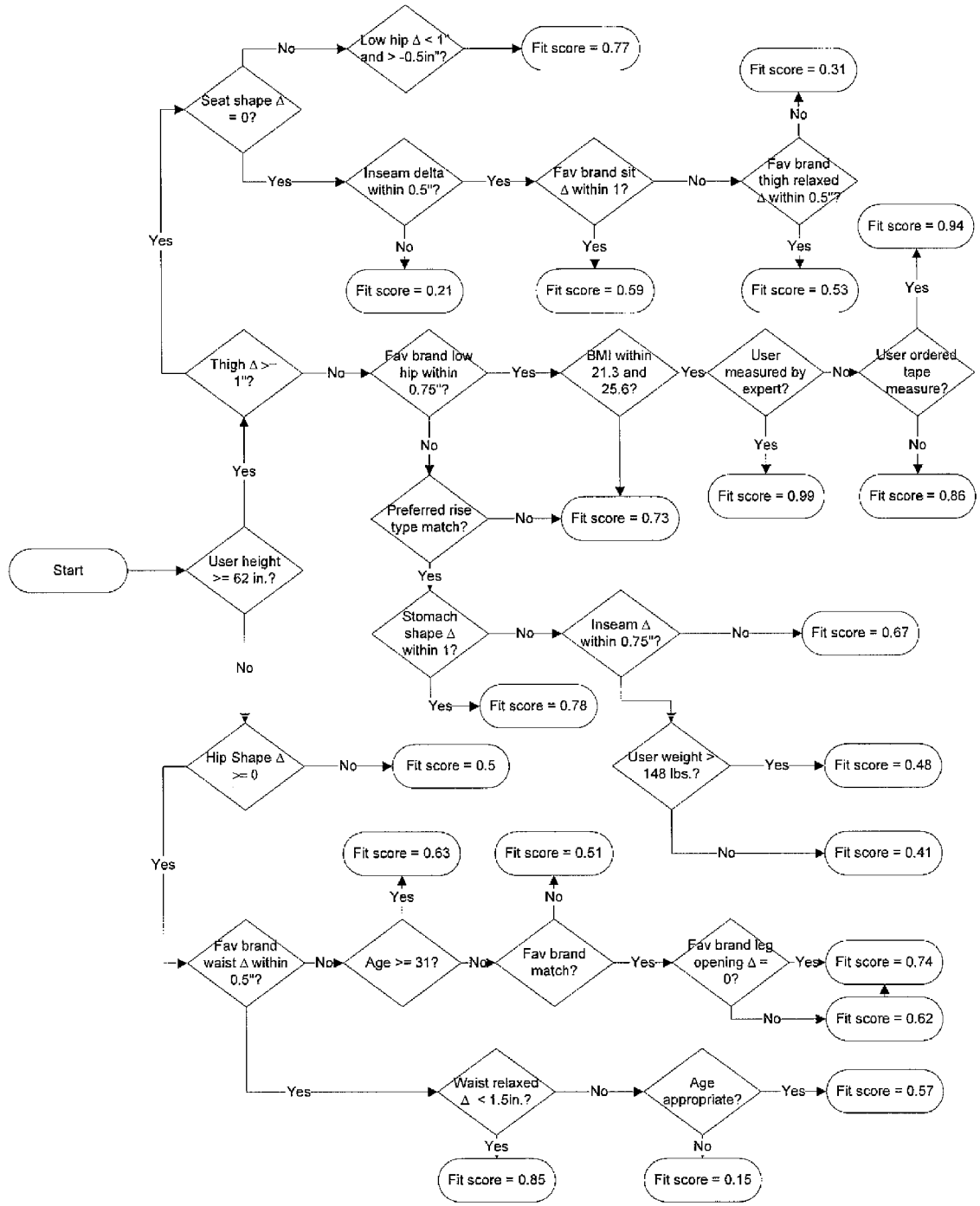
FIG. 5 is a flowchart representing example output of a machine learning engine, accordance with some embodiments of the invention.

Example output produced by the processing indicated at 416 is depicted in FIG. 5. Specifically, the example output shown in FIG. 5 is a decision tree, expressed graphically and generated by a C&R tree or CHAID model. Briefly, the decision tree defines criteria for making a series of evaluations based on consumer and/or item data, to and based on the result of those evaluations, follows branches which each terminate in a predicted fit score. As an example, if it is determined that the consumer's height is greater than or equal to 62 inches, the seat shape delta is not zero, the low hip delta is less than one inch but greater than negative 0.5 inches, then the fit score generated for the consumer for the considered item is 0.77. Other fit scores, each defined at the terminus of another branch, are generated if other criteria are satisfied.

In some embodiments, a model constructed using the techniques described above (e.g., the decision tree depicted in FIG. 5) may be converted to code (e.g., written in C, PHP, SQL, a custom format, and/or any other suitable language or form). Code may, for example, be stored in consumer-item fit rule set database, as indicated at 418, or in any other suitable storage facility.

Any or all of the modeling techniques listed above may be developed and/or executed using any suitable processing tools. For example, proprietary code, third-party or open-source software such as SAS, SPSS, Weka, etc., or any other suitable tool(s) may be used. Models generated may be run continuously, at predetermined intervals, or any other suitable interval(s). In some embodiments, several models may be generated, and the results of those models may be tested using gathered data to gauge the effectiveness of each at predicting fit. One or more models that are determined to produce the most accurate results may be selected to be stored, such as in the consumer-item fit rule database indicated at 418.

It should be appreciated that some embodiments of the invention may not construct or run a model using the entirety of training data gathered. For example, fit along a certain dimension may be predicted using a subset of the training data specific to that dimension. As an example, to predict whether an item will fit a consumer in the waist, training data may be filtered to identify only those records which include reason codes specific to the waist measurement (e.g., indicating "too tight in waist" or "too loose in waist", etc.) before a model is constructed and/or run. As such, multiple rule sets may be constructed and stored (e.g., in consumer-item fit rule database 418), each for an individual dimension or combination of dimensions, in addition to rules for producing an overall fit score.

In some embodiments, once a model is generated and selected for use, it may be employed by a fit prediction engine to generate a fit score for each consumer and item, as indicated at 501-502 (FIG. 4). By producing a fit prediction for every item for every consumer, embodiments of the invention may access that data quickly (e.g., as a user shops at an e-commerce site), rather than having to generate a prediction "on the fly." For example, code representing a model may be executed to score each consumer-item combination, based on criteria specified by the model, and write the result to a database, as indicated at 503, which includes a number of records equal to the number of consumers multiplied by the number of items. A representation of example data that may be generated and stored as indicated at 501-503 is shown below in Table 9.

TABLE 9

| Consumer ID | Item ID | Fit Score |
|---|---|---|
| 1 | 1 | 0.75 |
| 1 | 2 | 0.22 |
| 1 | 3 | 0.91 |
| ... | ... | ... |
| 99999 | 9997 | 0.42 |
| 99999 | 9998 | 0.63 |
| 99999 | 9999 | 0.57 |

As it may not be feasible to store a complete set of prediction data for a large populations of consumers and/or items, some embodiments of the invention may generate only a subset of the complete set represented in Table 9. For example, some embodiments may generate and store prediction data for consumer-item combinations deemed most likely to be encountered (e.g., fit scores for men's garments may not be generated for female consumers, and vice versa), or may not generate and store prediction data for less popular items, or for consumers that have not shopped for a long time. If a consumer that desires a fit prediction for an item without a pre-generated score, some embodiments of the invention may produce a prediction in real time. Of course, some embodiments of the invention may produce all predictions in real time, without pre-computing or storing and predictions ahead of time.

The processing described above with reference to FIG. 4 assumes that the training data used to train the machine learning engine is available. In practice, this may not be the case. For example, a retailer may have just started operating, and so it may not have historical order, satisfaction, and/or fit testing data on which to draw, or existing historical data may be stored in a format that is not easily processed (e.g., on paper, in unstructured text documents, etc.). As a result, some embodiments of the invention employ an expert database for bootstrapping, as indicated at 504.

In some embodiments, bootstrapping may employ a two-stage algorithm, in which the first stage involves assigning multiple fit scores (e.g., using a measurement fit algorithm, a static body-shape heuristic fit algorithm, and/or one or more other techniques), and the second phase involves "fusing" the multiple scores to generate a single overall fit score.

In the first stage, fit scores may be generated using any suitable technique. As indicated, two example techniques employ a measurement fit algorithm and a heuristic fit algorithm. Of course, any suitable technique may be employed to generate a fit score, as embodiments of the invention are not limited in this respect.

Commonly assigned U.S. Pat. No. 6,665,577, which is incorporated herein by reference in its entirety, describes an example measurement fit algorithm for producing a fit score based on a consumer's body measurements. The algorithm described produces a 5-star fit rating based on matches between a consumer's measurements and measurements of an item (e.g., garment).

An example heuristic fit algorithm employed in accordance with embodiments of the invention may also produce a fit rating (e.g., a 5-star fit rating) based on matches between a consumer's body shape and dimension heuristics (e.g., identified by a fit specialist as being determinative of good fit). A heuristic fit algorithm may employ output of a measurement fit algorithm (e.g., by starting with the rating generated thereby, or with a predetermined baseline, like a 3-star rating, if a low rating is generated) and modify that rating based on the correlation between the consumer's shape and the garment. For example, the heuristic fit algorithm may add to or subtract from a quantity rating generated by a measurement fit algorithm, based on heuristics exhibited by the consumer determined to be indicative of fit. Example heuristics that may be employed in this regard, and example amounts that may be added to or subtracted from a score to produced by a measurement fit algorithm, and shown in Table 10, below.

TABLE 10

| | | | | |
|---|---|---|---|---|
| Hip Shape | Curvy +/−.25 | Average 0 on match, −.25 on mismatch | Straight +/−.25 | |
| Seat Shape | Flat +/−.25 | Average 0 on match, −.25 on mismatch | Perky/High +/−.25 | Full/Wide +/−.25 |
| Stomach Shape | Flat 0 on mismatch, +.25 on match | Average 0 on match, −.25 on mismatch | Round/Low +/−.25 | Round/High +/−.25 |
| Thigh Shape | Slim +/−.25 | Average 0 on match, −.25 on mismatch | Full +/−.25 | Muscular +/−.25 |

Heuristics for an item may also be considered. For example, if a particular garment is known to "run small" (e.g., as determined by fit testers, consumer cluster analysis, and/or using other techniques), then this may be considered in producing a fit score that predicts how well the item will fit the consumer.

In the second stage, the fit scores generated in the first stage are combined. This may be done in any of numerous ways. For example, a rules-based fusion algorithm may combine the individual fit scores into an overall fit score. An algorithm may combine the scores in any manner, as embodiments of the invention are not limited in this respect. For example, an algorithm may average some or all of the scores, employ the minimum or maximum score, compute a weighted average of some or all of the scores, perform a combination of the foregoing, or employ some other technique(s), depending on the objectives to be achieved.

In some embodiments, an algorithm used to combine fit scores may ignore certain fit scores known to not be trustworthy for one reason or another. For example, if inputs to a Stage 1 algorithm are known to be compromised or problematic, then a fit score generated using that data may be ignored in generating an overall fit score.

Data generated through bootstrapping (e.g., using the techniques described to above) may be stored, as indicated at 503, with the data produced as indicated at 501-502.

The processing described above with reference to FIG. 4 may generate data for presentation to a consumer. As such, some embodiments of the invention provide an interface (e.g., a web based interface, an application or interface suitable for display on a mobile device such as a mobile telephone, personal digital assistant or employee handheld device, an interface for an in-store terminal, and/or other facility) through which a consumer may obtain a fit prediction for a particular item. In some embodiments deployed via the web, an interface may form part of an e-commerce website which enables consumers to browse or search for items of interest, such as one which enables the consumer to filter search results using criteria such as price, color, fabric, etc. However, it should be appreciated that embodiments of the invention are not limited to being implemented as an integrated part of a web site. For example, embodiments of the invention may be implemented as a fit prediction platform accessible, for example, through API calls to a hosted server, or as a standalone or integrated "widget" that displays fit information and communicates "under the covers" with a server (e.g., on which a web service is installed) to retrieve fit results. Embodiments of the invention may be implemented in any of numerous ways.

FIG. 6 depicts several example manners in which a system implemented in accordance with embodiments of the invention may interact with a consumer. In the example shown, the system may provide features such as enabling the consumer to select a subset of items to view on website based on hierarchical specification or parameterized search, as indicated at 607, and enabling a user to search or browse subset criteria, as indicated at 608. Using a fit score generated for the consumer and one or more items, a list of items matching criteria supplied by the user may be displayed in order of fit score, as indicated at 609, and a list of items matching subset criteria (e.g., in descending order of fit score) may be displayed, as indicated at 610. An indication may be provided on a given set of items predicting how those items will fit the consumer, based on attributes of the consumer and item, as indicated at 611.

How well an item is predicted to fit a consumer may be expressed in any of numerous ways. For example, the predicted fit of an item may be expressed using a to simple verbal Boolean description (e.g., "good fit", "bad fit", "yes", "no", etc.), using descriptive language (e.g., "too large in waist", "generally good fit but may be too small in hips", etc), and/or using one or more metaphors (e.g., a star system wherein a 5-star fit indicates a near perfect fit, while 1 star indicates poor fit). Any manner(s) of expression may be employed, as embodiments of the invention are not limited in this respect.

In addition to expressing a prediction of how a particular size of an item may fit the consumer, the system may also provide an indication of how well that size may fit as opposed to other sizes of the item. Thus, the system may suggest another size if predicted to fit better than the size selected by the consumer. Further, the system may suggest alterations to improve predicted fit. For example, if a particular item is predicted to fit a consumer well in many dimensions but may be too long for the consumer, the system may suggest hemming the item to improve the way it fits the consumer. In addition, the system may provide an indication of how well an item suits the consumer's exhibited style preferences, such as with a "style rating." Any of numerous types of information may be presented to a consumer, as embodiments of the invention are not limited in this respect.

An example interface 700 which may be used to present a fit prediction for a particular consumer and item is depicted in FIG. 7. The interface 700 includes three major regions: A, B and C. In region A, a fit prediction is expressed using a star rating metaphor. In the example shown, the item is rated as 3.5 stars of 5 stars, which interface 700 characterizes as an "excellent fit" for the considered consumer. In region B, interface 700 employs a tab metaphor to allow the consumer to select from among multiple sizes of the considered item, so that a prediction may be displayed for each size and the consumer may select the size predicted to best fit him/her. In the example shown, the user has selected size 36. Region C displays how the selected size of the item is predicted to fit the consumer along dimensions which include waist, seat, thigh (each of which is expressed along a continuum from "snug" to "loose") and inseam (expressed along a continuum from "short" to "long"). Region C indicates via shading the area along the continuum for each dimension that represents "your best fit," and via check marks where the selected size of the item falls along the continuum. It can be seen from the depicted example that the selected size of the item is predicted to fall within the area to designated as "your best fit" in the waist, seat and thigh dimensions, but outside the designated area in the inseam dimension, with the selected size being predicted to be a bit too long. The consumer may use this information to determine whether the selected size is predicted to fit well enough to justify a purchase, or whether another size might be a better fit.

Returning to FIG. 6, rather than relying on the consumer to search for and find items that are predicted to fit well, the system may proactively suggest items to the consumer based on predicted fit. For example, the system may produce a list of items sorted by user's fit score, as indicated at 612, produce a list of items in descending order of fit score for user, as indicated at 613, or suggest the top n items in order of predicted fit to the consumer, as indicated at 614. Alternatively, the system may suggest the top n items in order of predicted fit to the consumer by email, direct mail, in-store, or using other modes of communication, as indicated at 615.

Once selecting a particular item for further review, the consumer may then view item details, as indicated at 616, add the item to a cart, as indicated at 617, and/or purchase the item, as indicated at 618.

As FIG. 6 indicates, a consumer may provide the system with information to improve fit predictions, as indicated at 606, such as by supplying the information to a website (e.g., by completing one or more forms or questionnaires), as indicated at 601-605. Information may also be collected through non-automated means, such as via personal interview, or from an expert, as indicated at 212.

FIG. 6 also indicates that information may be collected upon the consumer returning a purchased item. For example, after making a purchase, a consumer may initiate a return using a website, which may pose one or more contextual questions based on the type of item returned, as indicated at 121, 130 and 131. The consumer's answers to these questions may be mapped to reason codes, and training data used by the machine learning engine may be updated using any of these codes.

For example, if a consumer indicates a desire to return an item, the system may ask the reason for the return. Example reasons from which the consumer may select include that the item didn't fit, the item was damaged in transit, the item was defective, to the wrong item was shipped, the consumer found a better price, the consumer didn't receive the item on time, and the item was uncomfortable. Based on the consumer's selection of a reason, the system may pose follow-up questions, which may depend on the type of item being returned. For example, if a pair of boots is being returned, and the consumer indicated that the boots did not fit, then the system may ask the consumer to describe why the boots did not fit. For example, the system may request the consumer to specify that the boots feel 1 size too small, ½ size too small, true to fit, ½ size too large, or 1 size too large; that the width is too narrow, true to size, or too wide; that the arch support feels minimal, moderate, or good; and/or that the boot shaft feels too narrow, true to size or too wide. Any of numerous questions may be posed to determine why an item did not fit a consumer.

It should be appreciated that embodiments of the invention may be employed in any of numerous ways, and are not limited to generating a fit prediction for a consumer regarding a particular item. For example, embodiments of the invention may be employed to generate garment pattern outputs optimized for a specific consumer, such as which may be used by a manufacturer to produce custom apparel items or custom footwear which suits the specific consumer's unique body profile and style preferences.

In addition, embodiments of the invention may be employed to generate fit model specifications, such as for an apparel designer or manufacturer. For example, a clothing designer could use an interface (e.g., provided by a website) to supply demographic information about a target consumer, which may recommend optimized body dimensions of a human fit model that best represents the target consumer identified by the designer so that the designer could better design clothing that will optimally fit his or her consumer base. A clothing designer could use this information to expedite the process of defining the fit of a new garment or shoe.

Further, embodiments of the invention may be employed to generate specific garment specifications for an apparel category, based on inputs supplied about a target consumer and desired garment category attributes, filtering the garment category by specific style heuristics and attributes. For example, a series of example specifications of "best selling" items (e.g., those having highest actual sales volume, lowest return rate, etc.) may be profiled in a digital garment library. A clothing designer could use this information to expedite the process of defining the fit of a new garment or shoe (as examples).

Figure 8:
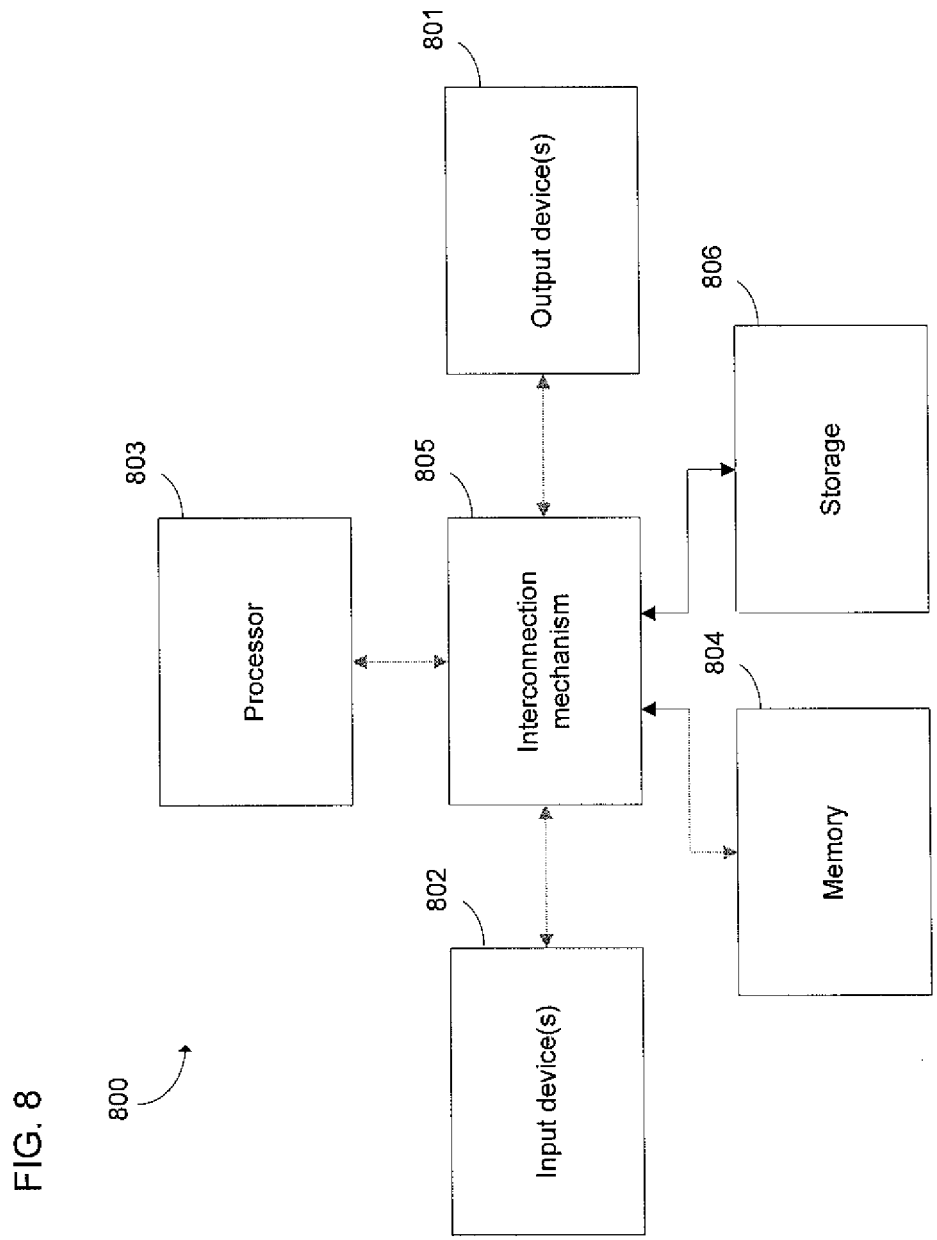
FIG. 8 is a block diagram depicting an example computer which may be used to implement aspects of the invention.

Various aspects of the systems and methods for practicing features of the present invention may be implemented on one or more computer systems, such as the exemplary computer system 800 shown in FIG. 8. Computer system 800 includes input device(s) 802, output device(s) 801, processor 803, memory system 804 and storage 806, all of which are coupled, directly or indirectly, via interconnection mechanism 805, which may comprise one or more buses, switches, networks and/or any other suitable interconnection. The input device(s) 802 receive(s) input from a user or machine (e.g., a human operator), and the output device(s) 801 display(s) or transmit(s) information to a user or machine (e.g., a liquid crystal display). The input and output device(s) can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

The processor 803 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

Figure 9:
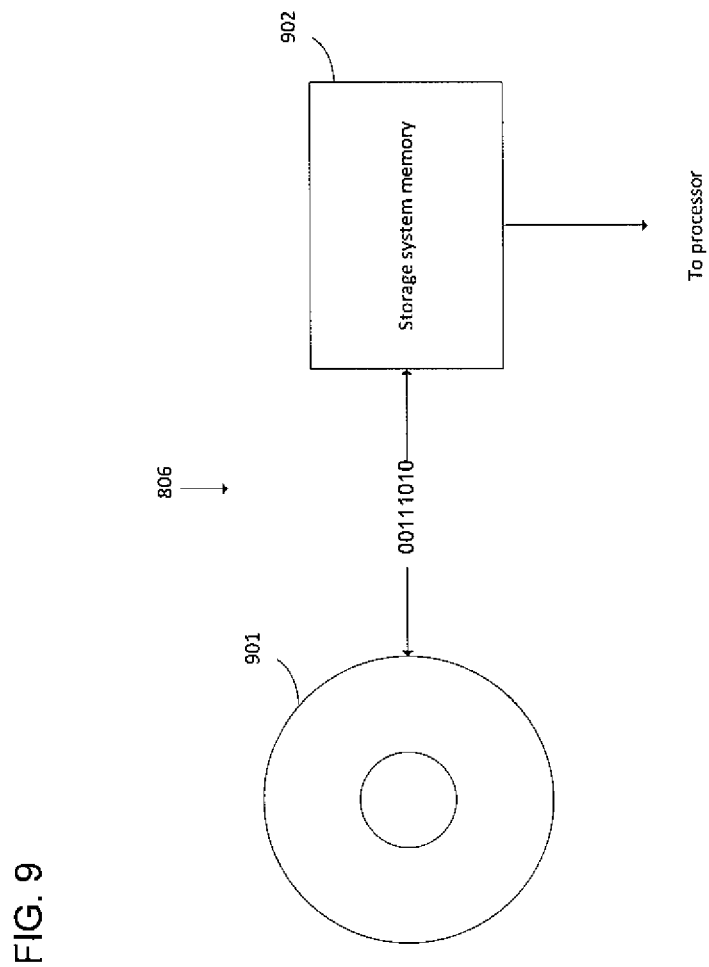
FIG. 9 is a block diagram depicting an example memory on which instructions embodying aspects of the invention may be stored.

Processor 803 may also execute one or more computer programs to implement various functions. These computer programs may be written in any type of computer program language, including a procedural programming language, object-oriented programming language, macro language, or combination thereof. These computer programs may be stored in storage system 806. Storage system 806 may hold to information on a volatile or non-volatile medium, and may be fixed or removable. Storage system 806 is shown in greater detail in FIG. 9.

Storage system 806 may include a tangible computer-readable and -writable non-volatile recording medium 901, on which signals are stored that define a computer program or information to be used by the program. The recording medium may, for example, be disk memory, flash memory, and/or any other article(s) of manufacture usable to record and store information. Typically, in operation, the processor 803 causes data to be read from the nonvolatile recording medium 901 into a volatile memory 902 (e.g., a random access memory, or RAM) that allows for faster access to the information by the processor 803 than does the medium 901. The memory 902 may be located in the storage system 806 or in memory system 804, shown in FIG. 8. The processor 803 generally manipulates the data within the integrated circuit memory 804, 902 and then copies the data to the medium 901 after processing is completed. A variety of mechanisms are known for managing data movement between the medium 901 and the integrated circuit memory element 804, 902, and the invention is not limited to any mechanism, whether now known or later developed. The invention is also not limited to a particular memory system 804 or storage system 806.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers and/or systems. Such processors may be implemented as integrated circuits, with one or more processors in an integrated circuit component, though a processor may be implemented to using circuitry in any suitable format.

It should be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should also be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of to operating systems or platforms. Additionally, such software may be written using any of a number of suitable programming languages and/or programming or scripting tools, and also may be compiled as executable machine language code or intermediate code that is executed on a framework or virtual environment.

In this respect, the invention may be embodied as a computer-readable medium (or multiple computer-readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in to various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in the illustrative embodiments described herein.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having,"

"containing," "involving," and variations thereof herein, is to meant to encompass the items listed thereafter and equivalents thereof as well as additional items.

What is claimed is:

1. A method for predicting whether a particular item will suit a particular consumer, the method comprising acts, performed by at least one computer, of:
   (A) receiving, by the at least one computer, data about a population of consumers and a population of items, the data comprising information relating to previous purchases and returns by certain of the population of consumers of certain of the population of items;
   (B) using the data received in (A), creating, by the at least one computer, a model for use in predicting whether certain of the population of items will suit certain of the population of consumers;
   (C) using the model created in (B), generating by the at least one computer, a prediction whether the particular item will suit the particular consumer; and
   (D) causing, by the at least one computer, a representation of the prediction to be displayed via a graphical display device.

2. The method of claim 1, wherein (C) comprises predicting whether the particular item is an appropriate size and/or shape for the particular consumer.

3. The method of claim 1, wherein the particular item is an item of apparel or footwear.

4. The method of claim 1, wherein the population of consumers comprises the particular consumer.

5. The method of claim 1, wherein the population of items comprises the particular item.

6. The method of claim 1, wherein the data received about the population of consumers in (A) comprises any of data useful for inferring body measurements of one or more of the population of consumers, data concerning style preferences of one or more of the population of consumers, web browsing history of one or more of the population of consumers, information on brands, styles, apparel or footwear that fit of one or more of the population of consumers well, demographics of one or more of the population of consumers, and gender of one or more of the population of consumers.

7. The method of claim 1, wherein the data received about the population of items in (A) comprises any of data useful for inferring measurements of one or more of the items and data concerning one or more of the items in stretched and relaxed states.

8. The method of claim 1, wherein (B) comprises creating a decision tree, neural network, support vector machine or regression model.

9. The method of claim 1, wherein (C) comprises predicting how well the particular item will suit the particular consumer.

10. The method of claim 1, further comprising:
    (E) causing a result of the predicting to be displayed to the particular consumer.

11. The method of claim 10, wherein (E) comprises causing a numeric fit score to be displayed to the particular consumer.

12. The method of claim 1, further comprising:
    (E) receiving feedback from the particular consumer regarding the particular item;
    (F) using the data received in (E), recreating the model;
    (G) using the model recreated in (F), predicting whether a certain item will suit the particular consumer.

13. The method of claim 1, wherein (A) comprises producing one or more metrics relating data about certain of the population of consumers to certain of the population of items.

14. The method of claim 1, wherein (A) does not comprise receiving data regarding body measurements of the population of consumers.

15. A tangible computer-readable storage medium having recorded thereon instructions which, when executed, perform a method for predicting whether a particular item will suit a particular consumer, the method comprising:
    (A) receiving data about a population of consumers and a population of items, the data comprising information relating to previous purchases and returns by certain of the population of consumers of certain of the population of items;
    (B) using the data received in (A), creating a model for use in predicting whether certain of the population of items will suit certain of the population of consumers; and
    (C) using the model created in (B), predicting whether the particular item will suit the particular consumer.

16. The tangible computer-readable storage medium of claim 15, wherein (C) comprises predicting whether the particular item is an appropriate size and/or shape for the particular consumer.

17. The tangible computer-readable storage medium of claim 15, wherein the particular item is an item of apparel or footwear.

18. The tangible computer-readable storage medium of claim 15, wherein the population of consumers comprises the particular consumer.

19. The tangible computer-readable storage medium of claim 15, wherein the population of items comprises the particular item.

20. The tangible computer-readable storage medium of claim 15, wherein the data received about the population of consumers in (A) comprises any of data useful for inferring body measurements of one or more of the population of consumers, data concerning style preferences of one or more of the population of consumers, web browsing history of one or more of the population of consumers, information on brands, styles, apparel or footwear that fit of one or more of the population of consumers well, demographics of one or more of the population of consumers, and gender of one or more of the population of consumers.

21. The tangible computer-readable storage medium of claim 15, wherein the data received about the population of items in (A) comprises any of data useful for inferring measurements of one or more of the items and data concerning one or more of the items in stretched and relaxed states.

22. The tangible computer-readable storage medium of claim 15, wherein (B) comprises creating a decision tree, neural network, support vector machine or regression model.

23. The tangible computer-readable storage medium of claim 15, wherein (C) comprises predicting how well the particular item will suit the particular consumer.

24. The tangible computer-readable storage medium of claim 15, further comprising:
    (D) causing a result of the predicting to be displayed to the particular consumer.

25. The tangible computer-readable storage medium of claim 24, wherein (D) comprises causing a numeric fit score to be displayed to the particular consumer.

26. The tangible computer-readable storage medium of claim 15, further comprising:
    (E) receiving feedback from the particular consumer regarding the particular item;
    (F) using the data received in (E), recreating the model;
    (G) using the model recreated in (F), predicting whether a certain item will suit the particular consumer.

27. The tangible computer-readable storage medium of claim 15, wherein (A) comprises producing one or more metrics relating data about certain of the population of consumers to certain of the population of items.

28. The tangible computer-readable storage medium of claim 15, wherein (A) does not comprise receiving data regarding body measurements of the population of consumers.

29. A system for predicting whether a particular item will suit a particular consumer, the system comprising:
at least one microprocessor programmed to:
(A) receive data about a population of consumers and a population of items, the data comprising information relating to previous purchases and returns by certain of the population of consumers of certain of the population of items;
(B) using the data received in (A), create a model for use in predicting whether certain of the population of items will suit certain of the population of consumers; and
(C) using the model created in (B), predict whether the particular item will suit the particular consumer.

30. The system of claim 29, wherein (C) comprises predicting whether the particular item is an appropriate size and/or shape for the particular consumer.

31. The system of claim 29, wherein the particular item is an item of apparel or footwear.

32. The system of claim 29, wherein the population of consumers comprises the particular consumer.

33. The system of claim 29, wherein the population of items comprises the particular item.

34. The system of claim 29, wherein the data received about the population of consumers in (A) comprises any of data useful for inferring body measurements of one or more of the population of consumers, data concerning style preferences of one or more of the population of consumers, web browsing history of one or more of the population of consumers, information on brands, styles, apparel or footwear that fit of one or more of the population of consumers well, demographics of one or more of the population of consumers, and gender of one or more of the population of consumers.

35. The system of claim 29, wherein the data received about the population of items in (A) comprises any of data useful for inferring measurements of one or more of the items and data concerning one or more of the items in stretched and relaxed states.

36. The system of claim 29, wherein (B) comprises creating a decision tree, neural network, support vector machine or regression model.

37. The system of claim 29, wherein (C) comprises predicting how well the particular item will suit the particular consumer.

38. The system of claim 29, further comprising:
(D) causing a result of the predicting to be displayed to the particular consumer.

39. The system of claim 38, wherein (D) comprises causing a numeric fit score to be displayed to the particular consumer.

40. The system of claim 29, further comprising:
(E) receiving feedback from the particular consumer regarding the particular item;
(F) using the data received in (E), recreating the model;
(G) using the model recreated in (F), predicting whether a certain item will suit the particular consumer.

41. The system of claim 29, wherein (A) comprises producing one or more metrics relating data about certain of the population of consumers to certain of the population of items.

42. The system of claim 29, wherein (A) does not comprise receiving data regarding body measurements of the population of consumers.

* * * * *